Aug. 30, 1966    B. A. CASH    3,269,639
RADAR REFLECTOR CONTAINER
Filed March 22, 1965
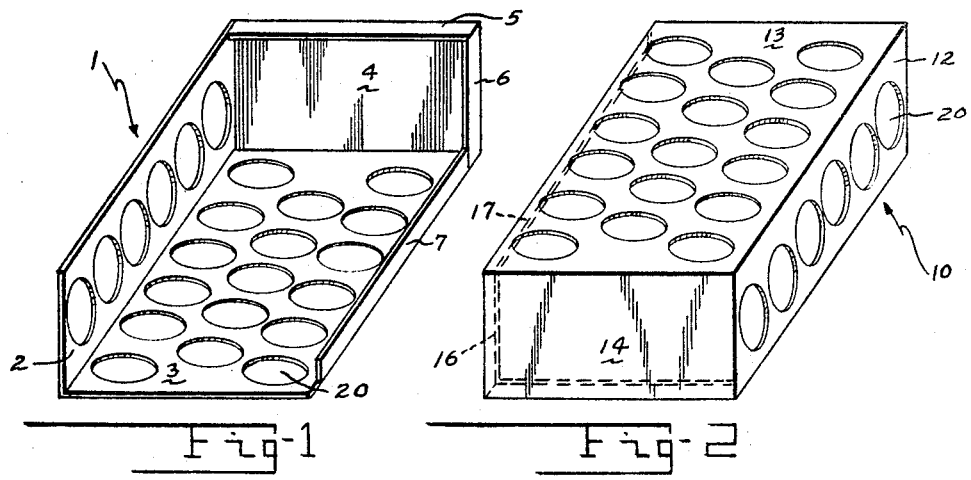
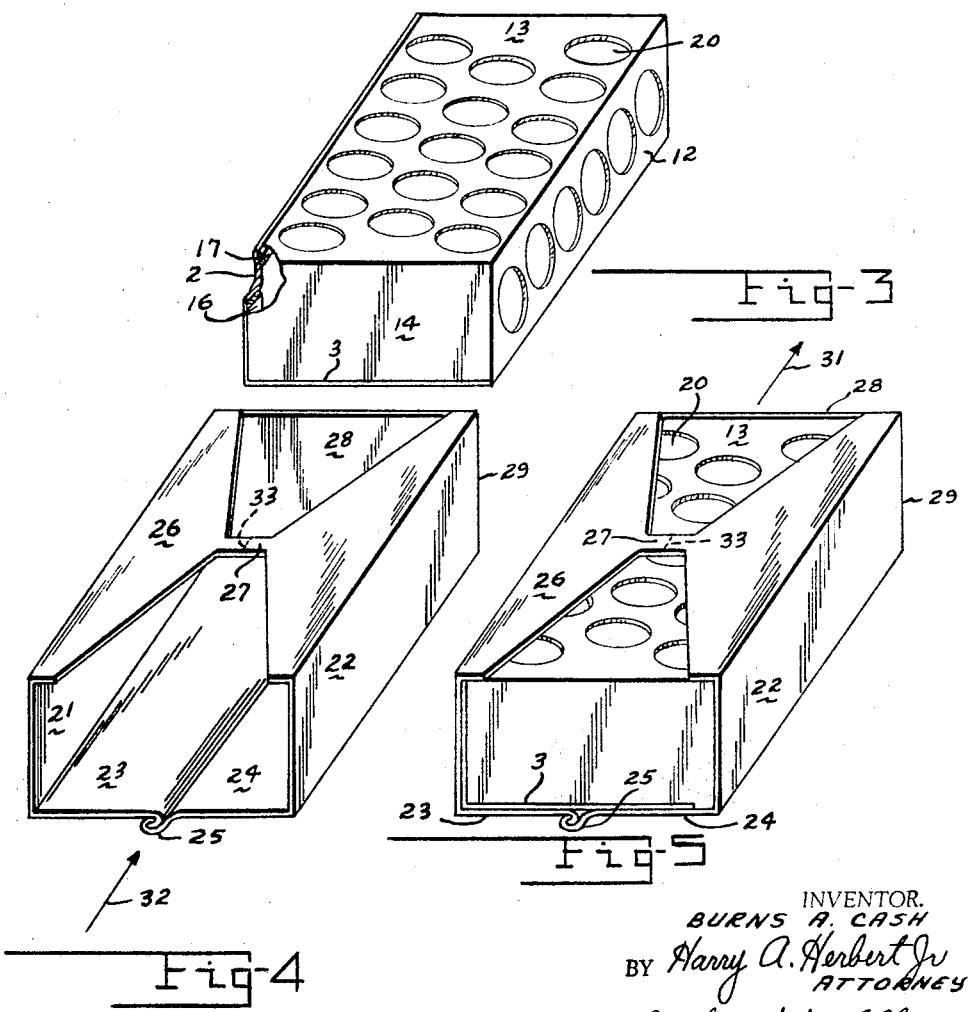
INVENTOR.
BURNS A. CASH
BY Harry A. Herbert Jr.
ATTORNEY
Richard J. Killoren
AGENT United States Patent Office 3,269,639
Patented August 30, 1966

3,269,639
RADAR REFLECTOR CONTAINER
Burns A. Cash, Madison, Wis., assignor to the United States of America as represented by the Secretary of the Air Force
Filed Mar. 22, 1965, Ser. No. 441,940
2 Claims. (Cl. 229—23)

This invention relates to a receptacle which is adapted to have radar reflective materials packaged therein, and from which said material may readily be dispersed into the atmosphere upon injection of the package into the atmosphere from an aircraft moving at high speed.

It is known that finely divided radar reflective materials, commonly called chaff, are excellent reflectors of high frequency radiation, such as radar beams. This phenomenon is used to give a false indication of a target to enemy radar, and in aerial warfare it is known that chaff may be dispensed for this purpose by an aircraft undergoing attack by a radar equipped fighter aircraft. If the chaff is dispersed properly, it appears to be a very large target to the attacking radar, which will then track the chaff instead of its intended target. When it is desired to utilize the chaff, which is packaged in containers, the packages are ejected from the aircraft by any suitable mechanism and because the packages are traveling at the same rate as the aircraft they are subjected to a high velocity air flow during their initial travel through the atmosphere. It is desired that the aerodynamic forces which are exerted on the package cause the package to be opened and cause its contents, the chaff, to be widely dispersed throughout the atmosphere. It is desired that such packages have minimum weight, resist high temperatures and be devoid of adhesive.

One object of the invention is to provide a container for radar reflective material which withstands high storage temperature, opens readily when placed in a high velocity air flow, and has minimum weight.

Another object is such container which utilizes no adhesive.

Other objects will become apparent from the drawings and from the following detailed description in which it is intended to illustrate the applicability of the invention without thereby limiting its scope to less than that of all equivalents which will be apparent to one skilled in the art. In the drawings, like reference numerals refer to like parts and:

FIGURE 1 is a perspective view of one portion of the container of the invention;

FIGURE 2 is a perspective view of another portion of the container of the invention;

FIGURE 3 is a perspective partially cut-away view of the container provided by fastening together the portions of FIGURES 1 and 2;

FIGURE 4 is a perspective view of a retainer member;

FIGURE 5 is a perspective view of the container of FIGURE 3 assembled together with the retainer of FIGURE 4.

Referring now to FIGURE 1, a portion which may be referred to as one-half of the basic container is indicated generally as 1. It is preferably made of metal foil, such as aluminum foil, and comprises side 2, bottom 3, and end 4. It is provided with folded edges at 5, 6 and 7 to facilitate attachement to another comparable portion which is its mirror image.

There is shown in FIGURE 2 a portion indicated generally as 10, which has configuration of a mirror image of portion 1, is made of the same material and comprises side 12, top 13 and end 14, and is provided with partially folded edges 15, 16 and 17 to facilitate attachment to portion of FIGURE 1.

Referring to FIGURE 3, a container in accordance with the invention is provided by attaching together the edges of FIGURES 1 and 2 as shown. It may be observed that holes 20 are provided in sides 2 and 12 and in bottom 3 and top 13. Radar reflective material may be provided within the container of FIGURE 3 in any desired manner. Mechanical locking seams are used rather than adhesive in order to conserve weight, facilitate the easy opening of the package and to avoid use of adhesive which would not resist high temperatures. Metal foil is used to provide a container having low weight and high heat resistance.

As shown in FIGURE 4, an outer retainer portion may be provided which comprises side portions 21 and 22, bottom portions 23 and 24 which are joined by crimped seam 25 and a top portion 26 which is provided at its center with a narrow neck 27 and an end portion 28 joined to the side portions at the meeting corners such as 29. The package of FIGURE 3 may be inserted in the retaining member of FIGURE 4 as shown in the manner indicated by arrow 32 to provide the assembly of FIGURE 5.

End 28 may be formed as shown or it may be omitted and an upstanding portion of a linked belt may serve in its place, the linked belt being part of the apparatus from which the package is ejected by the ejection mechanism.

When it is desired to eject the package of FIGURE 5 from the vehicle, it is ejected in the direction shown by arrow 31, and while being ejected a suitable portion of the ejection mechanism may cause top 26 to be torn or cut at neck 27 as indicated by dotted lines 33 to release the package of FIGURE 3 so that it may be easily opened by aerodynamic forces acting thereon after ejection.

What is claimed is:

1. A container, adapted to have radar reflective material packaged therein, comprising of two substantially identical portions, each of said portions having means for supporting the other in adjoining relation and having a plurality of openings therein; a retaining means for holding said two portions in adjoining relation, said retaining means comprising of a panel, surrounding said two portions, having two broad members connected by a severable narrow neck; said broad members being joined together on the side opposite said severable narrow neck, by means of crimping; and an end portion enclosing one end of said retainer.

2. A metal foil container, adapted to have radar reflective material packaged therein, comprising of two substantially identical portions in adjoining relation; each identical portion comprising of three perpendicular side walls joined along one edge of each of said side walls; each of said side walls of the said identical portions having a means by which the said identical portions are joined; at least two walls of each of said portions having a plurality of holes therein; said container being enclosed by a metal foil retainer comprising of four side members one side of which is joined at its center by a narrow severable neck; the side opposite the narrow severable neck is joined along its center, by means of crimping; and an end portion joined by means of partially folded edges to the side members at the meeting corners.

References Cited by the Examiner
UNITED STATES PATENTS

| 1,407,688 | 2/1922 | Banton | 220—83 |
| 2,143,156 | 1/1939 | Kennedy. | |
| 2,191,517 | 2/1940 | Carson | 206—45.31 X |
| 2,421,225 | 5/1947 | Stensgaard | 229—23 X |
| 2,675,123 | 4/1954 | Baird | 229—23 X |
| 2,774,504 | 12/1956 | Moore | 229—23 X |
| 3,192,917 | 7/1965 | Baert. | |

FOREIGN PATENTS 166,407   3/1959   Sweden.

GEORGE O. RALSTON, *Primary Examiner.*